(12) United States Patent
Fujimori et al.

(10) Patent No.: US 11,995,432 B2
(45) Date of Patent: May 28, 2024

(54) OPERATING DISPLAY DEVICES IN ASSOCIATION WITH EACH OTHER USING OLDER FIRMWARE

(71) Applicant: SEIKO EPSON CORPORATION, Tokyo (JP)

(72) Inventors: Toshiki Fujimori, Chino (JP); Masataka Yoshida, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 126 days.

(21) Appl. No.: 17/692,344

(22) Filed: Mar. 11, 2022

(65) Prior Publication Data
US 2022/0291920 A1    Sep. 15, 2022

(30) Foreign Application Priority Data
Mar. 12, 2021   (JP) ................. 2021-039999

(51) Int. Cl.
*G06F 8/65* (2018.01)
*G06F 3/14* (2006.01)

(52) U.S. Cl.
CPC .............. *G06F 8/65* (2013.01); *G06F 3/1454* (2013.01)

(58) Field of Classification Search
CPC .... G06F 8/60–66; G06F 3/1225; G06F 3/123; G06F 3/1454
See application file for complete search history.

(56) References Cited

U.S. PATENT DOCUMENTS

| | | | | |
|---|---|---|---|---|
| 8,561,052 | B2 * | 10/2013 | Kogan ...................... | G06F 8/65 717/170 |
| 2013/0055229 | A1 * | 2/2013 | Tung ................ | H04N 21/41415 717/168 |
| 2015/0331688 | A1 | 11/2015 | Shimizu | |
| 2019/0242351 | A1 | 8/2019 | Matsuyama et al. | |

FOREIGN PATENT DOCUMENTS

| | | |
|---|---|---|
| JP | 2006-243997 A | 9/2006 |
| JP | 2019-138298 A | 8/2019 |
| WO | WO2014/097436 A | 6/2014 |

* cited by examiner

*Primary Examiner* — Todd Aguilera
(74) *Attorney, Agent, or Firm* — Dority & Manning, P.A.

(57) ABSTRACT

A control method for a display device includes, in a state in which first firmware is installed, acquiring version information of second firmware installed in another display device from the other display device, inquiring the other display device about propriety of update of the second firmware to the first firmware when a version of the second firmware is older than a version of the first firmware, receiving the second firmware from the other display device when a notification for denying the update of the second firmware is received from the other display device, and updating the first firmware installed in the display device to the second firmware.

5 Claims, 4 Drawing Sheets

OPERATING DISPLAY DEVICES IN ASSOCIATION WITH EACH OTHER USING OLDER FIRMWARE

The present application is based on, and claims priority from JP Application Serial Number 2021-039999, filed Mar. 12, 2021, the disclosure of which is hereby incorporated by reference herein in its entirety.

BACKGROUND

1. Technical Field

The present disclosure relates to a control method for a display device and a display device.

2. Related Art

There has been known a mechanism for connecting, via a network, a display device and another display device provided in a remote location, the display device and the other display device providing functions in cooperation with each other.

In order to realize the mechanism, firmware of a certain or higher version needs to be installed in the display device and the other display device.

For example, in JP-A-2006-243997 (Patent Literature 1), a program is read out from a storage medium of a device installed with firmware of a new version and is transmitted to a device installed with firmware of an old version and the old firmware stored in a nonvolatile storage device is rewritten with the new firmware.

However, when installation of the firmware of the new version in the device installed with the firmware of the old version is rejected, it is sometimes difficult to cause a plurality of devices to operate in association with one another.

SUMMARY

An aspect of the present disclosure is directed to a control method for a display device installed with first firmware, the control method for the display device including: receiving selection of another display device to be coupled to the display device; acquiring, from the other display device, version information of second firmware installed in the other display device; inquiring the other display device about propriety of update of the second firmware to the first firmware when a version of the second firmware is older than a version of the first firmware; transmitting an acquisition request for the second firmware to the other display device when a rejection notification for rejecting the update is received from the other display device; and installing the second firmware in the display device and updating firmware installed in the display device from the first firmware to the second firmware.

An aspect of the present disclosure is directed to a display device installed with first firmware, the display device including: a communication section; an operation section configured to receive selection of another display device to be coupled to the display device; and a control section configured to acquire, from the other display, device, version information of second firmware installed in the other display device, inquire the other display device about propriety of update of the second firmware to the first firmware when a version of the second firmware is older than a version of the first firmware, transmit an acquisition request for the second firmware to the other display device when a rejection notification for rejecting the update is received from the other display device, install the second firmware in the display device, and update firmware installed in the display device from the first firmware to the second firmware.

DESCRIPTION OF EXEMPLARY EMBODIMENTS

Figure 1:
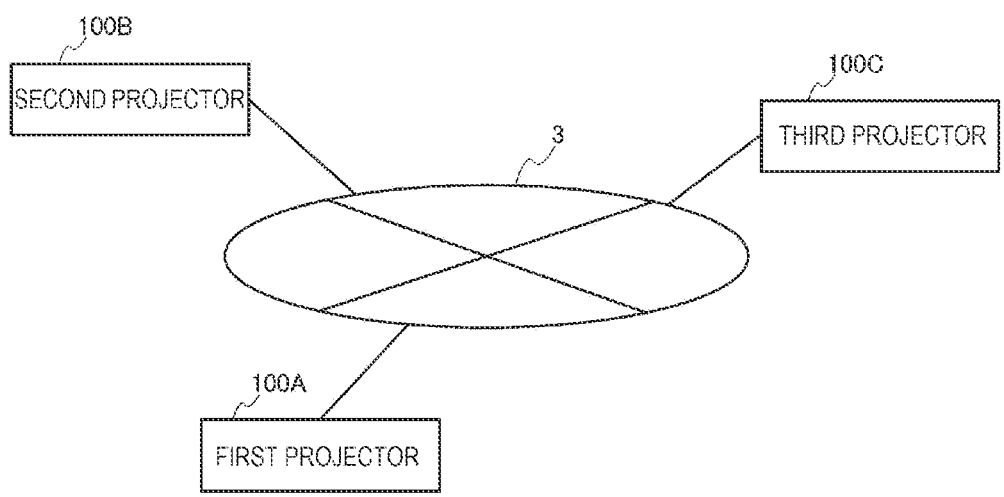
FIG. 1 is a diagram showing a system configuration.

FIG. 1 is a diagram showing an example of a system configuration in an embodiment.

A system 1 shown an FIG. 1 has a configuration in which three projectors 100, that is, a first projector 100A, a second projector 100B, and a third projector 100C are connected via a network 3. The first projector 100A is equivalent to an example of the display device. In the following explanation, when the first projector 100A, the second projector 100B, and the third projector 100C are collectively referred, the first projector 100A, the second projector 100B, and the third projector 100C are described as the projectors 100.

The network 3 is, for example, the Internet. Although the network 3 is the Internet in this embodiment, embodiments of the present disclosure are not limited to this. The network 3 may be a LAN (Local Area Network) or may be a WAN (Wide Area Network). The number of projectors 100 connected to the network 3 is not limited to three and only has to be two or more.

The first projector 100A, the second projector 100B, and the third projector 100C have an interactive function. The interactive function means a function of detecting operation of a pointer 7 on a projection surface 5A such as a screen and executing processing corresponding to the detected operation. The processing corresponding to the operation of the pointer 7 includes a pen drawing function for generating a drawn image such as a character or a figure corresponding to a track of pointed positions pointed by the pointer 7 and causing the projectors 100 to display the generated drawn image on the projection surface 5A.

In this embodiment, a pen-type pointer is used as the pointer 7. However, a finger of a user can also be used as the pointer 7.

Figure 2:
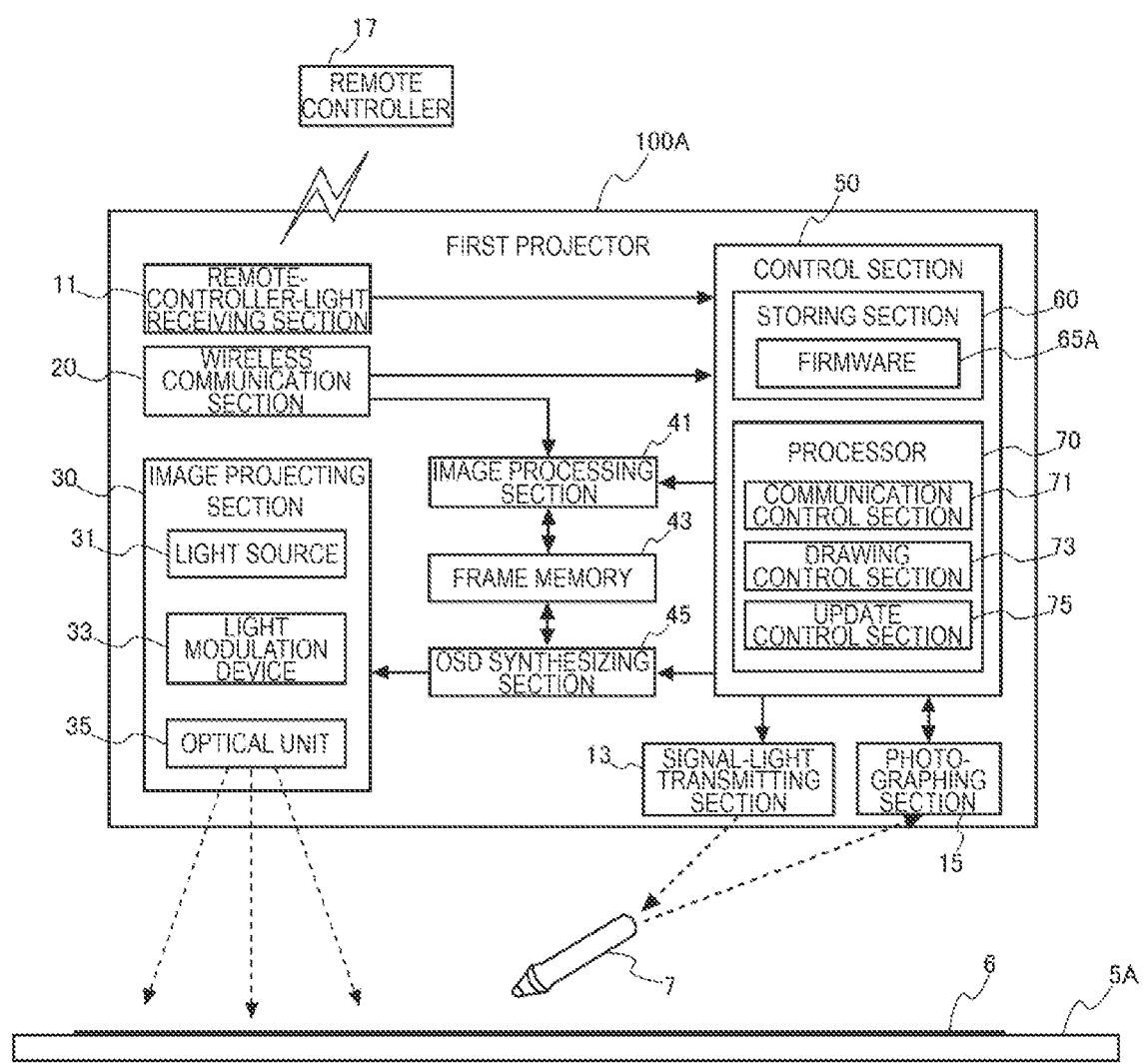
FIG. 2 is a diagram showing the configuration of a first projector.

FIG. 2 is a block diagram showing the configuration of the first projector 100A.

The configuration of the first projector 100A is explained. Since the second projector 100B and the third projector 100C have substantially the same configuration as the configuration of the first projector 100A, explanation about a detailed configuration of the second projector 100B and the third projector 100C is omitted. The first projector 100A is equivalent to the display device.

The first projector 100A includes an operation section, a wireless communication section 20, an image projecting section 30, an image processing system, and a control section 50 as main components.

The first projector 100A includes a remote-controller-light receiving section 11 as the operating section receiving an operation of the user, a signal-light transmitting section 13, and a photographing section 15.

The remote-controller-light receiving section 11 receives an infrared signal transmitted from a remote controller 17. The remote-controller-light receiving section 11 generates an operation signal corresponding to the received infrared signal and outputs the generated operation signal to the control section 50. The operation signal is a signal corresponding to a switch or the remote controller 17 operated by the user.

The signal-light transmitting section 13 transmits, according to control by the control section 50, a signal light for synchronizing light emission timing of the pointer 7 with photographing timing of the photographing section 15. The signal light is near infrared light having a predetermined light emission pattern. The pointer 7 emits light in the predetermined light emission pattern, for example, in synchronization with timing when the signal light is received. A light emission pattern of the pointer 7 is different depending on whether the pointer 7 is in contact with the projection surface 5A or not in contact with the projection surface 5A. When the first projector 100A is operating, the signal-light transmitting section 13 periodically transmits a synchronization signal.

The photographing section 15 includes a photographing element such as a CMOS (Complementary Metal-Oxide-Semiconductor) or a CCD (Charge Coupled Device) that receives light emitted by the distal end portion of the pointer 7.

The photographing section 15 photographs a range including the projection surface 5A at every fixed time interval and generates photographing data according to the control by the control section 50. The photographing section 15 outputs the generated photographing data to the control section 50. The control section 50 causes a storing section 60 explained below to store the photographing data input from the photographing section 15.

The wireless communication section 20 is equivalent to an example of the communication section and executes wireless communication such as wireless LAN including Wi-Fi (registered trademark) or NFC (Near Field Communication).

The wireless communication section 20 demodulates packet data from a received radio wave and extracts image data and a synchronization signal from the demodulated packet data. The wireless communication section 20 outputs the extracted image data to an image processing section 41.

The image projecting section 30 includes a light source 31, a light modulation device 33, and an optical unit 35.

As the light source 31, a lamp light source such as a halogen lamp, a xenon lamp, or an ultrahigh pressure mercury lamp is used. A solid-state light source such as an LED or a laser light source may be used as the light source 31.

The light modulation device 33 includes a light modulation element that modulates light emitted by the light source 31 and generates image light. The light modulation device 33 emits the image light modulated by the light modulation element to the optical unit 35. As the light modulation element, for example, a transmissive liquid crystal light valve, a reflective liquid crystal light valve, and a digital mirror device can be used.

The optical unit 35 includes optical elements such as a lens and a mirror and projects the image light modulated by the light modulation device 33 toward the projection surface 5A. Consequently, an image based on the image light is formed on the projection surface 5A A projection surface on which the first projector 100A displays an image is referred to as the projection surface 5A. A projection surface on which the second projector 100B displays an image is referred to as a projection surface 5B.

The image processing system of the first projector 100A is explained.

The first projector 100A includes, as the image processing system, the image processing section 41, a frame memory 43, and an OSD synthesizing section 45. The frame memory 43 includes a memory such as a RAM (Random Access Memory).

The image processing section 41 and the OSD synthesizing section 45 are arithmetic processing devices configured by CPUs (Central Processing Units), CPUs, microcomputers, or the like. The wireless communication section 20, the frame memory 43, and the control section 50 are coupled to the image processing section 41. The image processing section 41 develops image data input from the wireless communication section 20 in the frame memory 43.

The image processing section 41 performs image processing on the image data developed in the frame memory 43. The image processing performed by the image processing section 41 includes, for example, resolution conversion processing, resize processing, correction of a distortion aberration, shape correction processing, digital zoom processing, and adjustment of a tint and luminance of an image. The image processing section 41 executes processing instructed by the control section 50 and, according to necessity, performs processing using parameters input from the control section 50. Naturally, the image processing section 41 is capable of executing a plurality of kinds of image processing among the kinds of processing described above in combination.

The OSD synthesizing section 45 is coupled to the frame memory 43.

The OSD synthesizing section 45 synthesizes OSD (On Screen Display) data in the frame memory 43. The OSD data includes, for example, data of OSD images such as operation icons and menu icons. The OSD data may be generated by the OSD synthesizing section 45 or may be generated by the control section 50.

The configuration of the control section 50 is explained. The control section 50 is a computer device including the storing section 60 and a processor 70. The storing section 60 includes a volatile memory such as a RAM (Random Access Memory) and a nonvolatile memory such as a ROM (Read Only Memory) or a flash memory. The storing section 60 may include an HDD (Hard Disk Drive).

The storing section 60 stores a control program to be executed by the processor 70. The control program includes firmware 65A. The firmware 65A is equivalent to the first firmware.

Calibration data is stored in the storing section 60. The calibration data is data nor associating photographing data of the photographing section 15 and a projection region 6 of the projection surface 5A. More specifically, the calibration data is data for associating a coordinate set in the photographing data and a coordinate set in the frame memory 43. The projection region 6 is a region of the projection surface 5A on which the first projector 100A displays an image.

The processor 70 is an arithmetic processing device configured by a CPU (Central. Processing Unit), a microcomputer, or the like. The processor 70 executes the firmware 65A to control the sections of the first projector 100A. The processor 70 may be configured by a single processor or can be configured by a plurality of processors. The processor 70 may be configured by an SoC integrated with a part of or the entire storing section 60 and other circuits. The processor 70 may be configured by a combination of a CPU that executes a program and a DSP (Digital Signal Processor) that executes predetermined arithmetic processing. Further, all of functions of the processor 70 may be implemented in hardware or may be configured using a programmable device.

The control section 50 includes a communication control section 71, a drawing control section 73, and an update control section 75 as functional blocks. These functional blocks indicate functions realized by the processor 70 executing the control program.

The communication control section 71 controls the wireless communication section 20 and transmits and receives various kinds of information to and from the other projectors 100 including the second projector 100B and the third projector 100C.

The drawing control section 73 acquires photographing data from the storing section 60, analyzes the acquired photographing data, and detects a pointed position of the pointer 7. The drawing control section 73 converts a coordinate value indicating the detected pointed position into a coordinate value in the frame memory 43 according to the calibration data. The drawing control section 73 generates drawing data corresponding to the converted coordinate value and outputs the generated drawing data to the image processing section 41. The image processing section 41 draws the drawing data input from, the drawing control section 73 in a corresponding coordinate of the frame memory 43. Thereafter, the OSD synthesizing section 45 reads out, as display data, the image data, the drawing data, and the OSD data developed in the frame memory 43 and outputs the read-out display data to the image projecting section 30. The image projecting section 30 generates image light corresponding to the display data. The generated image light is projected onto the projection surface 5A by the optical unit 35. Consequently, an image corresponding to the image data, a drawn image corresponding to the drawing data, and an OSD image corresponding to the OSD data are displayed on the projection surface 5A.

The update control section 75 controls update of the firmware 65A.

For example, common connection and the projector 100, which a connection destination of the common connection, are selected by operation of the remote controller 17 or the like, the update control section 75 determines whether update of the firmware 65 is performed. In the following explanation, firmware is collectively referred to as firmware 65.

The common connection is a function of, for example, when the first projector 100A and the second projector 100B are connected in common, the first projector 100A and the second projector 100B projecting the same projection image on the projection surface 5A and the projection surface 5B. For example, when the first projector 100A and the second projector 100B are connected in common, a drawn image drawn on the projection surface 5. A by the user of the first projector 100A with the pointer 7 is displayed also on the projection surface 5B on which an image is displayed by the second projector 100B. Similarly, a drawn image drawn on the projection surface 5B by the user of the second projector 100B with the pointer 7 is displayed also on the projection surface 5A on which an image is displayed by the first projector 100A. The second projector 100B is equivalent to the other display device.

For example, when being connected in common, the first projector 100A transmits information concerning a coordinate set in the frame memory 43 included in the first projector 100A to the second projector 100B. The information concerning the coordinate information concerning a coordinate in which an image displayed on the projection surface 5A by the first projector 100A is developed and includes information concerning resolutions in the vertical direction and the horizontal direction.

The second projector 100B generates calibration for associating the information concerning the coordinate received from the first projector 100A and photographing data of the photographing section 15 of the second projector 100B.

When detecting a pointed position of the pointer 7, the second projector 100B converts a coordinate value indicating the detected pointed position into a coordinate value in the frame memory 43 of the first projector 100A according to the calibration data. The second projector 100B generates drawing data corresponding to the converted coordinate value and develops the generated drawing data in the frame memory 43 included in the second projector 100B. The second projector 100B transmits the generated drawing data to the first projector 100A.

In the case of the common connection, by adopting the same version as versions of firmware of the projectors 100 connected in common, colors of drawn images, dispositions of menu icons displayed on the projection surface 5A and the projection surface 5B, and the like can be made the same among the projectors 100. When versions of the firmware 65 are different, for example, in some case, a color selected by the first projector 100A cannot be displayed by the second projector 100B and the second projector 100B displays an alternative color.

First, the update control section 75 generates OSD data indicating a list of the projectors 100 connected to the network 3 and outputs the generated OSD data to the OSD synthesizing section 45. Consequently, the list of the projectors 100 is displayed on the projection surface 5A by the image projecting section 30. Subsequently, the update control section 75 receives selection of the projectors 100 to be connected in common. One projector may be selected or a plurality of projectors may be selected. In the following explanation, it assumed that the second projector 100B is selected.

When the second projector 100B is selected, the update control section 75 requests the selected second projector 100B to transmit version information of the firmware 65 installed in the second projector 100B. The firmware 65 installed in the second projector 100B is described as firmware 65B. The firmware 65B is equivalent to the second firmware.

The update control section 75 compares a version of the firmware 65B acquired from the second projector 100B and a version of the firmware 65A installed in the first projector 100A.

When the version of the firmware 65A is older than the version of the firmware 65B, the update control section 75 transmits an acquisition request for the firmware 65 to the second projector 100B. At this time, the update control section 75 causes the image projecting section 30 to display, on the projection surface 5A, guidance display for confirming whether the firmware 65A may be updated to the firmware 65B. When receiving operation for permitting the update to the firmware 65B, the update control section 75 transmits an acquisition request for the firmware 65B to the second projector 100B.

When receiving the firmware 65B from the second projector 100B, the update control section 75 rewrites the firmware 65 of the first projector 100A from the firmware 65A to the firmware 65B.

When the version of the firmware 65A is newer than the version of the firmware 65B, the update control section. 75 transmits update confirmation to the second projector 100B. The update confirmation is confirmation for inquiring the second projector 100B whether the firmware 65B of the second projector 100B is updated to the firmware 65A. When receiving a notification of update permission from the second projector 100B, the update control section 75 reads out the firmware 65A from the storing section 60 and transmits the read-out firmware 65A to the second projector 100B.

When receiving a notification of update rejection from the second projector 100B, the update control section 75 requests the second projector 100B to transmit function information, which is information concerning a function executable by the firmware 65B of the old version. When receiving the function information from the second projector 100B, the update control section 75 causes the image projecting section 30 to display the received function information on the projection surface 5A. The update control section 75 causes the image projecting section 30 to display, on the projection surface 5A, confirmation guidance for inquiring whether the firmware 65 of the first projector 100A is downgraded to the firmware 65B.

When receiving, with the remote controller 17, operation for permitting the downgrade to the firmware 65B, the update control section 75 transmits an acquisition request for the firmware 65B to the second projector 100B.

When receiving the firmware 65B from the second projector 100B, the update control section 75 rewrites the firmware 65 of the first projector 100A to the received firmware 65B.

When the common connection to the second projector 100B is released, the update control section 75 updates the firmware 65 of the first projector 100A from the firmware 65B to the firmware 65A and returns the firmware 65 to the original version.

Figure 3:
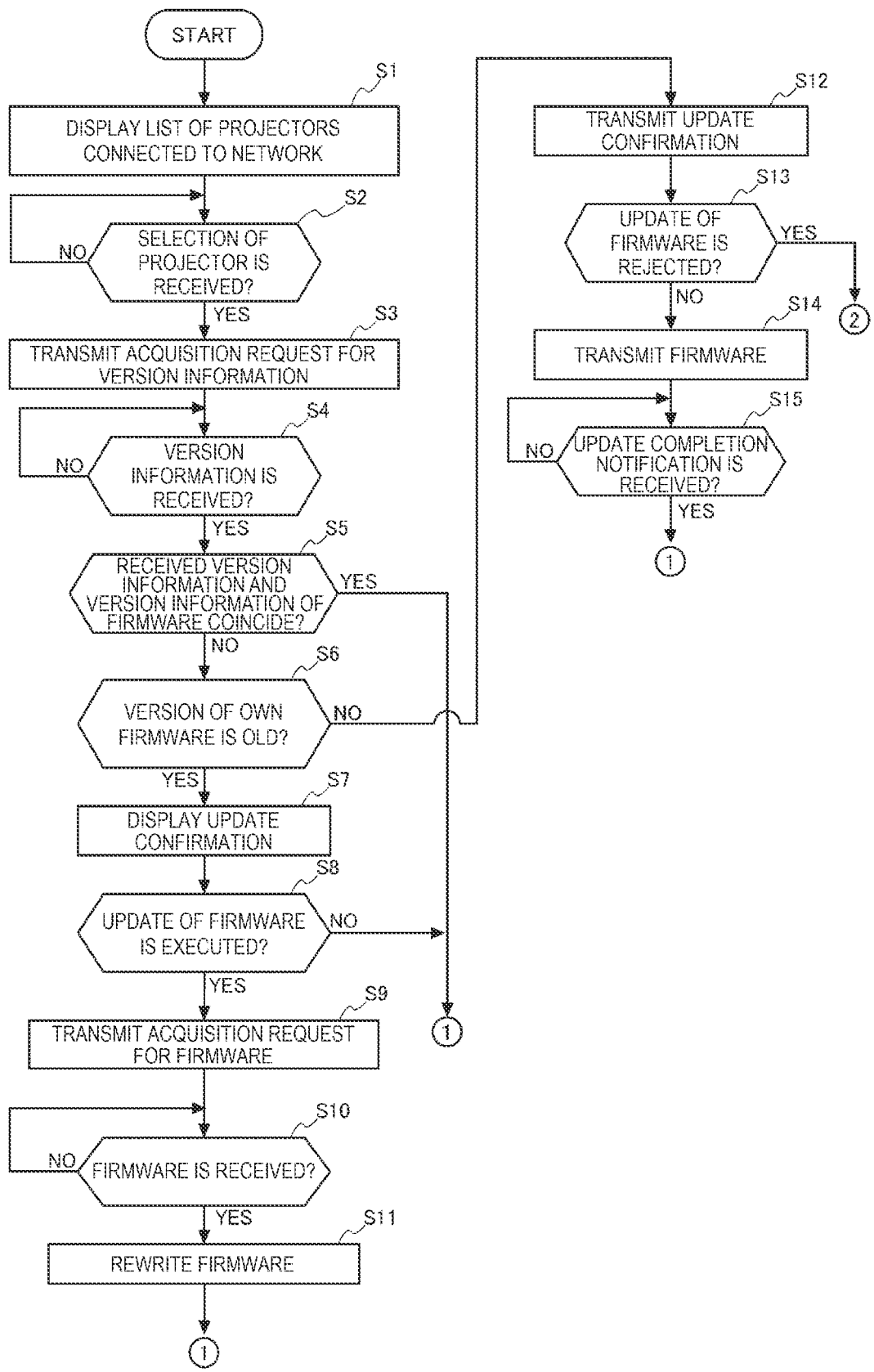
FIG. 3 is a flowchart showing the operation of the first projector.
Figure 4:
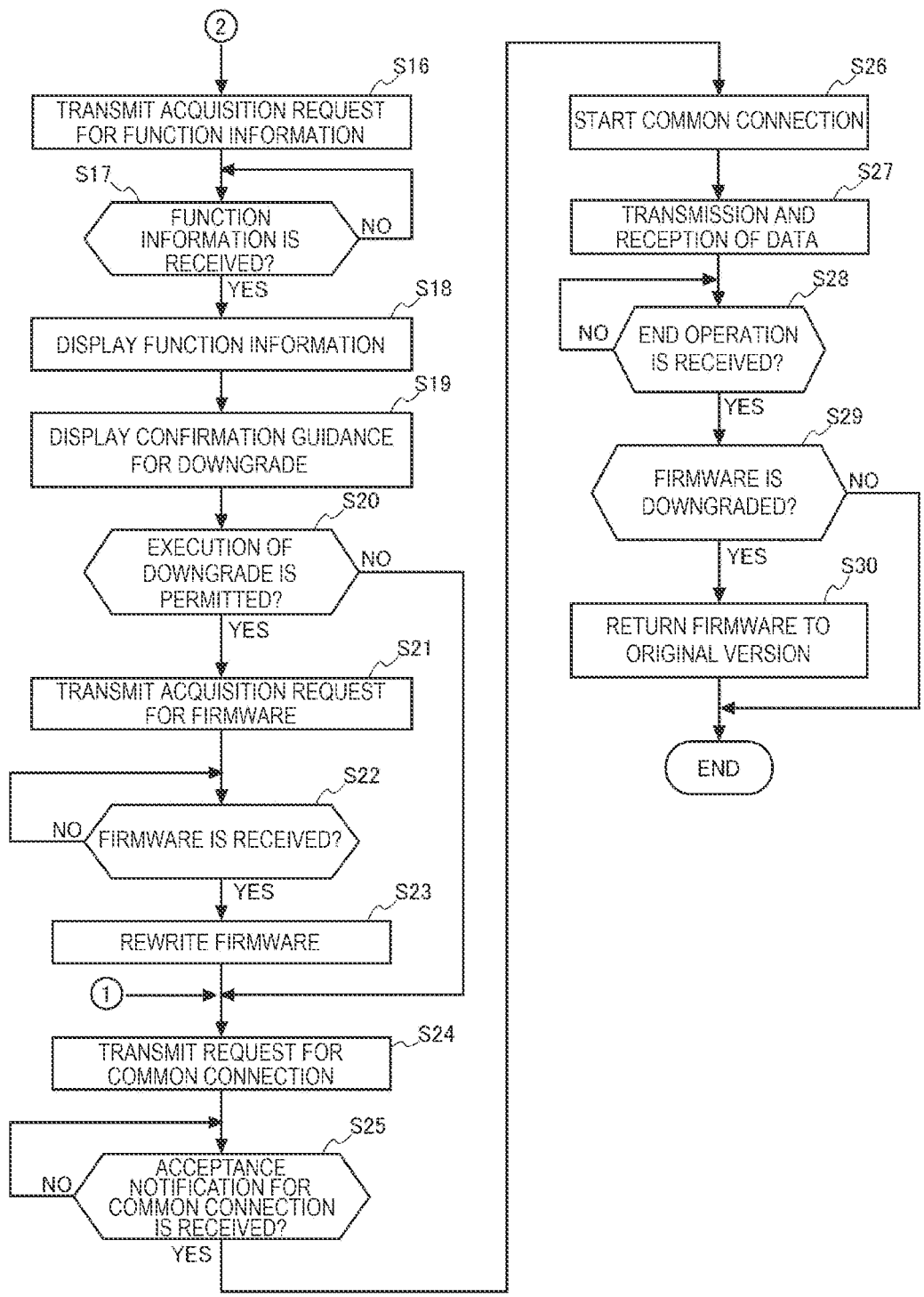
FIG. 4 is a flowchart showing the operation of the first projector.

FIGS. 3 and 4 are flowcharts showing the operation of the control section 50.

First, the control section 50 causes the image projecting section 30 to display, on the projection surface 5A, a list of identification information such as model names and IP addresses of the projectors 100 connected to the network 3 (step S1) and receives selection of the projector 100 to which common connection is requested.

When not receiving, with the remote controller 17, operation for selecting the projector 100 (NO in step S2), the control section 50 stays on standby until receiving operation for selecting the projector 100. In the following explanation, it is assumed that the second projector 100B is selected as a request destination of common connection.

When receiving operation for selecting the projector 100 (YES in step S2), the control section 50 transmits an acquisition request for version information of the firmware 65B to the selected second projector 100B (step S3). The control section 50 stays on standby until receiving version information of firmware from the second projector 100B (NO in step S4).

When receiving version information of the firmware 65B from the second projector 100B (YES in step S4), the control section 50 determines whether the received version information and version information of the firmware 65A coincide (step S5).

When the received version information and version information of the firmware 65A do not coincide (NO in step S5), the control section 50 determines whether a version of the firmware 65A is older than a version of the firmware 65B (step S6).

When the version of the firmware 65A is older than the version of the firmware 65B (YES in step S6), the control section 50 causes the image projecting section 30 to display update confirmation for inquiring whether the firmware 65A is updated to the firmware 65B (step S7). The update confirmation is displayed on the projection surface 5A by the image projecting section 30.

When receiving, with the remote controller 17, operation for updating the firmware 65A to the firmware 65B (YES in step S8), the control section 50 requests the second projector 100B to transmit the firmware 65B (step S9). Thereafter, the control section 50 determines whether the firmware 65B is received from the second projector 100B (step S10). The control section 50 stays on standby until receiving the firmware 65B from the second projector 100B (NO in step S10).

When receiving the firmware 65B from the second projector 100B (YES in step S10), the control section 50 rewrites the firmware 65 of the first projector 100A to the firmware 65B (step S11). Thereafter, the control section 50 shifts to processing in step S24.

When the version of the firmware 65A is newer than the version of the firmware 65B in the determination in step S6 (NO in step S6), the control section 50 transmits update confirmation for the firmware 65 to the second projector 100B (step S12).

When a response received from the second projector 100B is update permission for the firmware 65 (NO in step S13), the control section 50 transmits the firmware 65A of the first projector 100A to the second projector 100B (step S14). Thereafter, the control section 50 determines whether an update completion notification for the firmware 65 is received from the second projector 100B (step S15). The control section 50 stays on standby until receiving the update completion notification for the firmware 65 from the second projector 100B (NO in step S15).

When receiving the update completion notification for the firmware 65 from the second projector 100B (YES in step S15), the control section 50 shifts to the processing in step S24.

When the version information of the firmware 65 coincides in the determination of step S5 (YES in step S5) and when receiving, with the remote controller 17, operation for not updating the firmware 65A to the firmware 65B (NO in step S8), the control section 50 also shifts to the processing in step S24.

A continuation of the operation of the control section 50 is explained with reference to the flowchart of FIG. 4.

When receiving a response of update rejection from the second projector 100B (YES in step S13), the control section 50 transmits an acquisition request for function information indicating a function executable by the firmware 65B to the second projector 100B (step S16). The control section 50 stays on standby until receiving the function information from the second projector 100B (NO in step S17).

When receiving the function information from the second projector 100B (YES in step S17), the control section 50 causes the image projecting section 30 to display the received function information on the projection surface 5A (step S18). The control section 50 causes the image projecting section 30 to display, on the projection surface 5A, confirmation guidance confirming whether the firmware 65 of the first projector 100A is downgraded to the firmware 65B (step S19).

When receiving, with the remote controller 17, operation for permitting the downgrade to the firmware 65B (YES in step S20), the control section 50 transmits an acquisition request for the firmware 65B to the second projector 100B (step S21). Thereafter, the control section 50 stays on standby until receiving the firmware 65B from the second projector 100B (NO in step S22). When receiving, with the remote controller 17, operation for not permitting the downgrade to the firmware 65B (NO in step S20), the control section 50 shifts to the processing in step S24.

When receiving the firmware 65B from the second projector 100B (YES in step S22), the control section 50 rewrites the firmware 65 of the first projector 100; to the received firmware 65B (step S23). Thereafter, the control section 50 transmits a request for common connection to the second projector 100B (step S24) and stays on standby until receiving an acceptance notification for the common connection from, the second projector 100B (NO in step S25).

Subsequently, when receiving the acceptance notification for the common connection from the second projector 100B (YES in step S25), the control section 50 starts the common connection to the second projector 100B (step S26). The control section 50 performs transmission and reception of data to and from the second projector 100B (step S27). The control section 50 analyzes photographing data generated by the photographing section 15 and detects a pointed position of the pointer 7. The control section 50 converts a coordinate value indicating the detected pointed position into a coordinate value in the frame memory 43 according to the calibration data and generates drawing data. The control section 50 outputs the generated drawing data to the image processing section 41 and transmits the generated drawing data to the second projector 100B via the wireless communication section 20.

The control section 50 receives, with the wireless communication section 20, drawing data transmitted from the second projector 1003. The drawing data is data generated by the second projector 100B and is drawing data corresponding to the position of the projection surface 5B that the user points using the pointer 7.

Thereafter, the control section 50 determines whether operation for ending the common connection is received (step S28). When the operation for ending the common connection is not received (NO in step S28), the control section 50 stays on standby until receiving the operation for ending the common connection.

When receiving the operation for ending the common connection (YES in step 328), the control section 50 determines whether the firmware 65 is downgraded at a start time of the common connection (step S29). When the firmware 65 is not downgraded (NO in step S29), the control section 50 ends the processing flow. When the firmware 65 is downgraded (YES in step S29), the control section 50 returns the firmware 65 of the first projector 100A to the firmware 65A before the downgrade (step S30) and ends the processing flow.

As explained above, the firmware 65A is installed in the first projector 100A in this embodiment. The first projector 100A receives the selection of the second projector 100B to be connected to the first projector 100A and acquires, from the second projector 100B. The version information of the firmware 65B installed in the second projector 100B.

When the version of the firmware 65B is older than the version of the firmware 65A of the first projector 100A. The first projector 100A inquires propriety of update of the firmware 65B to the firmware 65A.

When receiving the rejection not for rejecting the update from the second projector 100B, the first projector 100A transmits the acquisition request for the firmware 65B to the second projector 100B.

The first projector 100A installs, in the first projector 100A, the firmware 65B received from the second projector 100B. Consequently, the firmware installed in the first projector 100A is updated from the firmware 65A to the firmware 65B.

Therefore, when the version of the firmware 65 does not coincide with the version of the firmware 65B of the selected second projector 100B and the second projector 100B rejects the update of the firmware 65B, the firmware of the first projector 100A can be updated to the firmware 65B.

Therefore, it is possible to cause the first projector 100A and the second projector 100B to operate with firmware of the same version. It is possible to cause these projectors 100 to operate in association with each other.

When receiving the notification for rejecting the update of the firmware from the second projector 100B, the first projector 100A acquires, from the second projector 100B, the information concerning the function executable by the firmware 65B and causes the image projecting section 30 to display the information on the projection surface 5A.

When receiving the operation for requesting the acquisition of the firmware 65B, the first projector 100A transmits the acquisition request for the firmware 65B to the second projector 100B.

Therefore, when being permitted by the user, it is possible to update the firmware 65 to the firmware 65B of the version older than the version of the firmware 65A. It is possible to prevent update of firmware unintended by the user.

When the version of the firmware 65A is older than the version of the firmware 65B, the first projector 100A transmits the acquisition request for the firmware 65B to the second projector 100B.

The first projector 100A installs, in the first projector 100A, the firmware 65B received from the second projector 100B. Consequently, the firmware installed in the first projector 100A is updated from the firmware 65A to the firmware 65B.

Therefore, it is possible to update the firmware 65 of the first projector 100A to firmware of a new version.

The first projector 100A is connected to the second projector 100B, executes the firmware 65B, and transmits data generated by the execution of the firmware 65B to the second projector 100B. The first projector 100A receives the data generated by the second projector 100B executing the firmware 65B and processes the received data.

When the connection to the second projector 100B is released, the first projector 100A returns the firmware installed in the first projector 100A from the firmware 65B to the firmware 65A.

Therefore, even if firmware of an old version is temporarily installed, the firmware can be returned to firmware of a new version.

The embodiment explained above is only an example of a specific form to which the present disclosure is applied and does not limit the present disclosure. The present disclosure can also be applied as different forms.

For example, when the control method for the display device is realized using a computer included in the display device, a program to be executed by the computer can also be configured in a form of a recording medium or a transmission medium for transmitting the program. As the recording medium, a magnetic or optical recording medium or a semiconductor memory device can be used.

At least a part of the functional blocks of the first projector 100A shown in FIG. 2 may be realized by hardware or may be realized by cooperation of the hardware and software. The first projector 100A is not limited to the configuration in which the independent hardware resources are disposed as shown in FIG. 2 and may be a configuration including functional sections other than those shown in FIG. 2.

The processing units of the flowcharts of FIGS. 3 and 4 are divided according to the main processing contents in order to facilitate understanding of the processing of the control section 50. Therefore, the present disclosure is not limited by a method of the division and names of the processing units shown in the flowcharts of FIGS. 3 and 4. The processing of the control section 50 can also be divided into larger number of processing units according to the processing contents and can also be divided such that one processing unit includes a larger number of kinds of processing. The processing order of the flowcharts is not limited to the example shown in FIGS. 3 and 4.

What is claimed is:

1. A control method for a display device comprising:
    in a state in which first firmware is installed, acquiring version information of second firmware installed in another display device from the other display device;
    inquiring the other display device about propriety of update of the second firmware to the first firmware in response to a version of the second firmware being older than a version of the first firmware;
    receiving the second firmware from the other display device in response to a notification for denying the update of the second firmware being received from the other display device; and
    updating the first firmware installed in the display device to the second firmware.

2. The control method for the display device according to claim 1, further comprising transmitting an acquisition request for the second firmware to the other display device in response to the notification for denying the update of the second firmware being received from the other display device.

3. The control method for the display device according to claim 1, further comprising:
    acquiring information concerning a function executable by the second firmware from the other display device in response to the notification for denying the update being received from the other display device; and
    displaying the information concerning the function.

4. The control method for the display device according to claim 1, further comprising:
    connecting to the other display device;
    executing the second firmware;
    transmitting data generated by executing the second firmware to the other display device;
    causing the other display device to execute the second firmware;
    releasing the connection to the other display device in response to the other display device receiving the data; and
    updating the second firmware installed in the display device to the first firmware.

5. A display device comprising one or a plurality of processors programmed to:
    in a state in which first firmware is installed, acquire version information of second firmware installed in another display device from the other display device;
    inquire the other display device about propriety of update of the second firmware to the first firmware when a version of the second firmware is older than a version of the first firmware;
    cause the other display device to transmit the second firmware to the display device when a notification for denying the update of the second firmware is received from the other display device;
    receive the second firmware from the other display device; and
    update the first firmware installed in the display device to the second firmware.

* * * * *